United States Patent [19]

Mann

[11] Patent Number: 4,813,517

[45] Date of Patent: Mar. 21, 1989

[54] MODULAR MANIFOLD BRAKE HOSE END FITTING

[75] Inventor: Robert W. Mann, Birmingham, Mich.

[73] Assignee: Michigan Brake Manufacturing, Inc., Troy, Mich.

[21] Appl. No.: 221,818

[22] Filed: Jul. 20, 1988

Related U.S. Application Data

[62] Division of Ser. No. 866,256, May 23, 1986, Pat. No. 4,772,051.

[51] Int. Cl.⁴ .............................................. B60T 11/10
[52] U.S. Cl. .................................. 188/152; 188/71.1; 138/106
[58] Field of Search .................. 188/152, 71.1, 151 A, 188/382, 352; 303/1, 6.01, 86; 138/103, 106–110, 111; 285/150, 62, 131, 39, 137.1, 175, 256; 60/533, 584, 591, 327

[56] References Cited

U.S. PATENT DOCUMENTS

| | | | |
|---|---|---|---|
| 1,214,985 | 2/1917 | Barber | 285/131 X |
| 1,825,034 | 9/1931 | Weatherhead, Jr. | 285/131 X |
| 2,062,449 | 12/1936 | Dick | 285/131 X |
| 3,019,646 | 2/1962 | Gavih | 285/131 X |
| 3,142,358 | 7/1964 | Woerheide | 285/150 X |
| 3,517,782 | 6/1970 | Hayes | 188/152 |
| 3,522,705 | 8/1970 | Wienecke | 188/152 X |
| 3,526,419 | 9/1970 | Saguchi | 285/150 X |
| 3,692,147 | 9/1972 | Yeh et al. | 188/152 X |
| 4,153,279 | 5/1979 | Blue | 285/62 |
| 4,626,006 | 12/1986 | Noguchi et al. | 285/256 X |

FOREIGN PATENT DOCUMENTS 2231112 1/1973 Fed. Rep. of Germany ...... 285/150
2723556 11/1978 Fed. Rep. of Germany ...... 285/150

Primary Examiner—Douglas C. Butler
Attorney, Agent, or Firm—Cullen, Sloman, Cantor, Grauer, Scott & Rutherford

[57] ABSTRACT

A high pressure manifold brake hose end fitting used in a brake system to reduce the number of wet fittings required in the brake system. The manifold brake hose end fitting has a crimped sleeve connection to a reinforced rubber brake hose on one end, a first receptacle for a hydraulic fitting on the opposite end and a second receptacle formed in the side of the fitting between the one end and the opposite end. A conduit is provided for hydraulic fluid flow through the fitting and in one embodiment, the conduit is preferably eccentrically located away from the side of the fitting including said second receptacle. An end fitting providing three or more receptacles in a single fitting that may be part of one or more fluid systems is disclosed. A brake system and a method of installing brake fluid conduits are also disclosed which use the end fitting to reduce the number of wet fittings in a brake system and reduce the number of steps required to install a brake fluid conduit on a vehicle.

6 Claims, 2 Drawing Sheets

U.S. Patent  Mar. 21, 1989  Sheet 1 of 2  4,813,517
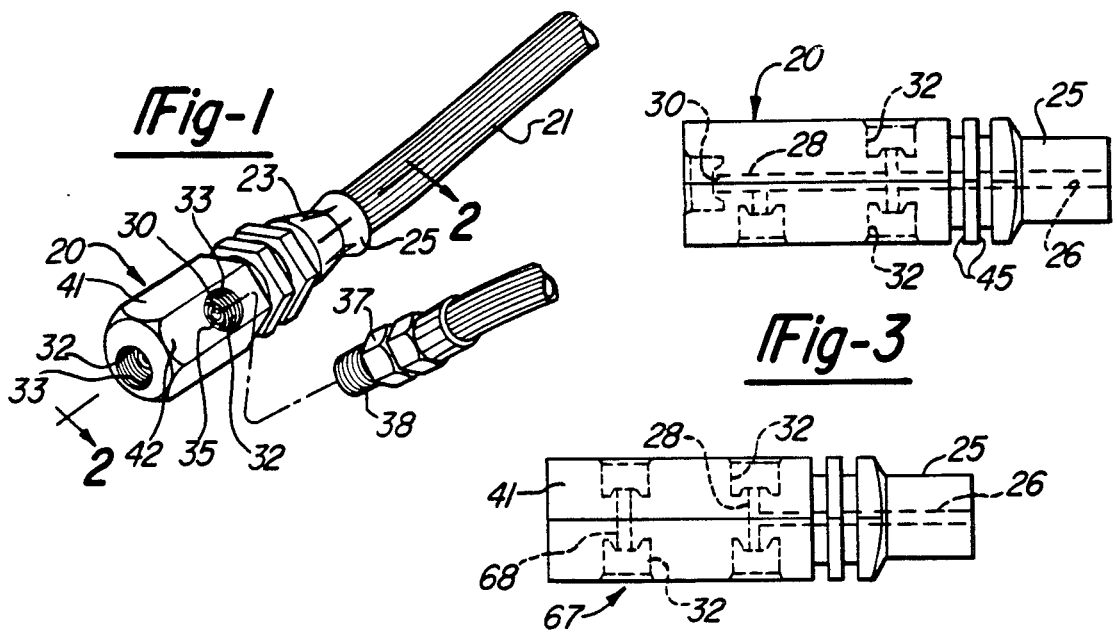
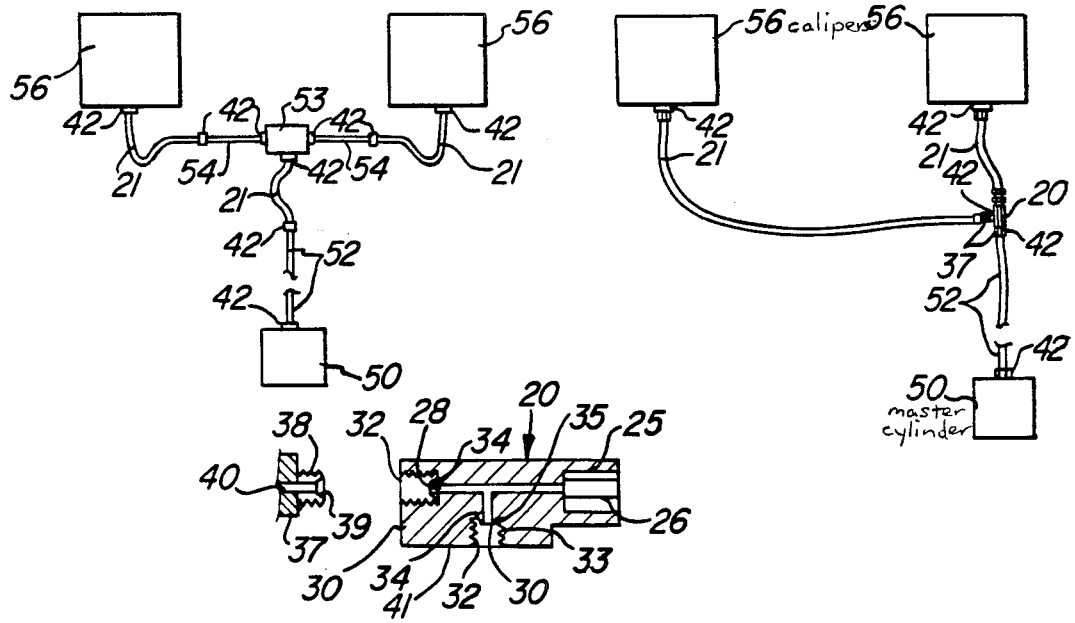

MODULAR MANIFOLD BRAKE HOSE END FITTING

This is a division of application Ser. No. 866,256 filed on May 23, 1986 now U.S. Pat. No. 4,772,051.

BACKGROUND OF THE INVENTION

1. Technical Field

The present invention relates to end fittings for brake hoses and an improved hydraulic brake system utilizing manifold brake hose end fittings.

II. Brief Description of the Background Art

Hydraulic brake systems have long been used to provide braking for automotive vehicles. In vehicle braking systems, a hydraulic system functions as a control link being the operator's brake pedal, the master cylinder and the wheel braking mechanism. Braking mechanisms may include, for example, calipers for disc brakes or brake shoes for drum brakes.

The present invention is primarily concerned with the hydraulic system from the master cylinder to the brake mechanism located on the vehicle wheels. Hydraulic fluid transmits operator foot pressure from the master cylinder to the brake mechanism through steel tubing and reinforced rubber hose. The reinforced rubber hose is used to interconnect the rigid steel tubing segments of the braking system which are mounted to the chassis and either additional rigid steel tubing or brake mechanism parts which are mounted either to the axle or to the wheel hub.

Referring now to FIG. 4, a prior art braking system is shown schematically wherein a trunk line leads from the master cylinder to a point on the chassis adjacent the axle where it is connected to a flexible reinforced rubber hose which is connected on its other end to a separate tee fitting. The tee fitting is connected to two sections of rigid hydraulic tubing which extend in opposite directions along the axle toward each of the vehicle wheels. Each axle-mounted length of steel tubing is connected to the brake mechanism by means of an additional flexible, reinforced rubber hose.

An important consideration in the design of brake systems is the minimization of the number of "wet fittings". A "wet fitting" is a threaded connection between serially connected elements of the hydraulic brake line system. In vehicle assembly operations, wet fittings require careful assembly and subsequent testing to ensure the integrity of the hydraulic brake system. The great majority of leaks in hydraulic brake systems occur at wet fittings. Therefore, it is an object when designing hydraulic brake systems to minimize the number of wet fittings. Flexible reinforced rubber hoses, referred to herein as brake hoses, have generally been used as links in a hydraulic brake system where there is relative movement between two parts, such as between the frame and an axle, between the frame and a wheel hub, or between the axle and a brake mechanism attached to a wheel. Brake hoses generally have fittings on both ends that are attached to the hose by a crimped connection which is capable of withstanding pressures up to 3,000 psi.

It is an objective of the present invention to provide an improved brake hose end fitting which functions as a manifold wherein a plurality of hydraulic fitting connections may be made in a single fitting.

Another object of the present invention is the provision of a brake hose end fitting of minimum outer diameter and incorporating one or more receptacles for receiving end fittings of tubing or other lengths of brake hose.

A further object of the present invention is to provide a brake hydraulic system wherein the minimum number of wet fittings are required thereby reducing manufacturing costs and improving reliability.

An additional objective of the present invention is to provide a method of assembling a brake hydraulic system wherein a manifold brake hose end fitting is used to interconnect a wheel brake hose to the chassis brake line and to a second portion of the hydraulic brake system which routes hydraulic fluid pressure to a second wheel.

SUMMARY OF THE INVENTION

In accordance with the invention, a manifold brake hose end fitting formed as a solid one-piece body is provided which interconnects at least three segments of a hyraulic brake system. The end fitting comprises a body with an inlet port on one end that opens into an internal conduit formed inside the body. Two female connectors are formed on other surfaces of the body which open into the internal conduit. The female connectors are cylindrical openings having internal threads formed on its cylindrical sides and an end face at the inner end having a convex conical nipple centrally located in the inner end face which defines an opening for fluid communication with the internal conduit. One of the female connectors is preferably formed in a first lateral side of the body. The internal conduit extending through the body is closer to the lateral side opposite the first lateral side. The eccentric location of the internal conduit relative to the first side is intended to minimize the size of the fitting while accommodating a male connector wherein the base face of the female connector does not open into the conduit.

In accordance with another aspect of the invention, the manifold brake hose end fitting comprises a body having an inlet port on one end which opens into an internal conduit formed through the body. The body of the end fitting has a plurality of wrench flats on its exterior. At least two female connectors are formed in the body with one female connector preferably being located on the opposite end from the inlet port and a second female connector being formed in the body to intersect the conduit between the inlet port and first female connector, the second female connector being substantially confined to one of said wrench flats.

A brake system made in accordance with the present invention comprises a brake actuator, such as a brake pedal, which is mechanically connected to a master cylinder which contains hydraulic fluid for transmitting hydraulic pressure to the brakes of a vehicle. The hydraulic fluid is distributed through a system comprising a series of steel and reinforced rubber tubes which conduct hydraulic pressure to either the rear or front wheels. The brake system of the present invention is further characterized by the provision of an end fitting at the end of a first brake hose which is connected to the front or rear trunk line which includes a second female connector for interconnection with a second brake hose or tube in a manifold relationship. If the second interconnection is a steel brake tube, it may be an axle brake tube line which extends from the connection to the end of the axle to be connected with a brake hose or a brake mechanism.

In accordance with the method of the present invention, a hydraulic brake fluid conduit system may be attached to a vehicle by first attaching a trunk line to a master cylinder on one end and securing the other end of the trunk line to the chassis adjacent the front or rear axle. The second end of the trunk line is provided with a male connector which is adapted to be received in one of two female connectors formed in a brake hose end fitting of a brake hose which is directly connected to a brake mechanism of a wheel. The end fitting further includes a second female connector to which a second brake hose or brake tube line is attached. The method of the present invention may alternatively comprise securing an axle brake tube line to the axle and in turn connecting a brake hose to the other end of the tube and the other brake mechanism.

Other objects and advantages of the invention will become apparent upon reading the following detailed description and upon reference to the drawings.

BRIEF DESCRIPTION OF THE DRAWINGS

FIG. 1 is a perspective view of a manifold brake hose end fitting attached to a brake hose and a hydraulic brake hose fitting.

FIG. 2 is a cross-sectional view of the manifold brake hose end fitting taken along the line 2—2 in FIG. 1.

FIG. 3 is a side elevational view of a four port manifold brake hose end fitting with the four ports and the internal conduit interconnecting the four ports shown in phantom lines.

FIG. 4 is a schematic representation of a prior art front brake hydraulic system.

FIG. 5 is a schematic representation of a front end hydraulic brake system implementing the present invention.

FIG. 8 is an elevational view of a manifold brake hose end fitting showing a primary hydraulic fluid conduit and distribution female connectors and a parallel fluid circuit comprising a separate conduit and female connectors for a parallel hydraulic or pneumatic circuit.

DETAILED DESCRIPTION OF THE INVENTION

Figure 6:
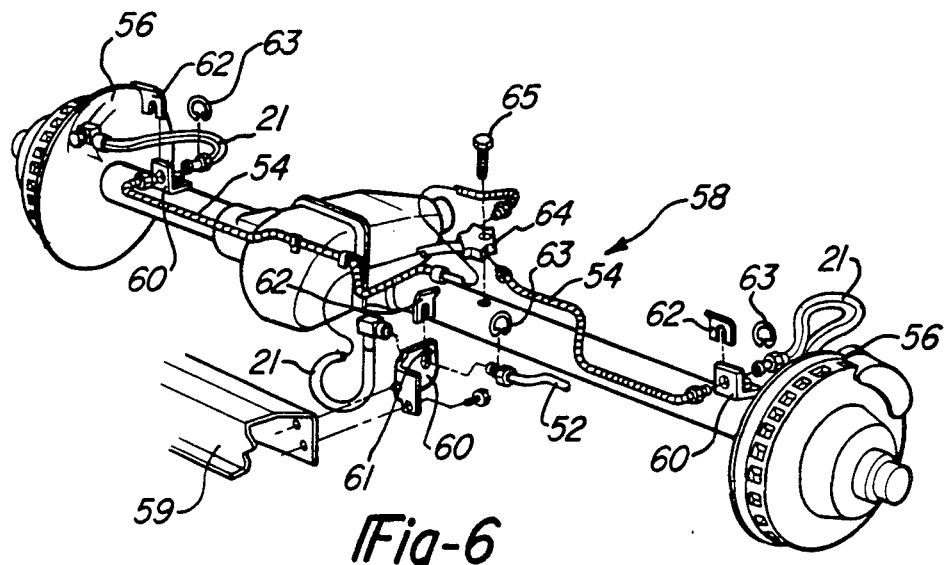
FIG. 6 is a fragmentary perspective view partially exploded of a prior art rear axle hydraulic system.

Referring now to the drawings, in particular FIGS. 1 and 2, a solid, one-piece manifold brake hose end fitting 20 is shown attached to a brake hose 21. The reinforced elastomeric brake hose 21 is attached to the end fitting 20 by a crimped fitting 23 wherein an integrally formed sleeve 25 is collapsed to compress the reinforced elastomeric tubing between the sleeve 25 and a tubular extension 26 centrally located within the sleeve 25. The tubular extension 26 is received within the brake hose 21 prior to collapsing the sleeve 25. The tubular extension 26 aligns the brake hose 21 with an internal conduit 28 formed in the body of the end fitting 20.

The internal conduit 28 is contiguous with the tubular extension 26 so that hydraulic fluid may flow within the brake hose 21 through the tubular extension 26 and into the internal conduit 28. The internal conduit 28 extends through the end fitting 20 to two or more ports 30. The plurality of ports 30 impart to the end fitting 20 its manifold capability wherein fluid pressure from a single source may be distributed to a plurality of hydraulically operable devices.

The ports 30 of the internal conduit 28 open into female connectors 32, which are preferably high pressure hydraulic fittings. High pressure is defined as being more than 500 psi. The female connectors 32 comprise a threaded bore 33 which extends into the end fitting 20 a predetermined distance where it terminates in an end face 34 which is disposed substantially perpendicular to the threaded bore 33 and includes a centrally located convex conical nipple 35 that surrounds the port 30 and extends outwardly from the base face 34.

Male connectors 37, preferably of the high pressure hydraulic fitting type, are adapted to be received within the female connectors 32. The male connectors 37 have an externally threaded tubular portion 38 which is received within the threaded bore 33. The threaded tubular portion 38 terminates in a concave conical surface 39 disposed about a central bore 40.

The female connectors 32 and male connectors 37 are designed to form a seal when connected together. The connection between the female connectors 32 and male connectors 37 is referred to as a "wet fitting" since the two respective parts are normally not connected until assembly of the system. In vehicle assembly operations the wet fittings of the brake hydraulic system are generally assembled on-line in the assembly operation and require considerable care in assembly and subsequent testing to assure the integrity of the brake system.

In a preferred embodiment of the present invention, wrench flats 41 are formed on the exterior sides of the end fitting 20 which permit a wrench to be applied to the fitting during assembly and service operations. In the preferred embodiment, as shown in FIG. 1, at least one of the female connectors 32 extends through only one of the wrench flats 41 so that the male connector 37 may be connected to one of the wrench flats 41.

It has been found that to minimize the required diameter of an end fitting 20, the internal conduit 28 should be eccentrically located closer to the side opposite the wrench flat in which the female connector 32 is formed, thereby preventing the base face 34 from opening into the conduit 28. While it is recognized that the use of a larger diameter end fitting 20 may obviate the need for an eccentrically located conduit 28, for weight reduction it is preferred to use the smallest possible end fitting 20 for each application.

Referring now to FIG. 3, an end fitting 20 having four ports 30 connected by the internal conduit 28 is illustrated. The internal conduit 28 is not eccentrically located due to the fact that the female connectors 32 are located on diametrically opposed sides of the end fitting 20. The number of ports 30 provided on an end fitting 20 is dependent upon the requirement of the hydraulic system.

Annular grooves 45 are preferably formed on the exterior surface of the end fitting to receive anchoring devices as will be more fully described with reference to FIGS. 7 and 8 below.

Referring now to FIGS. 4 and 5, a prior art front end brake system of FIG. 4 will be compared to a front end brake system made in accordance with the present invention. Referring to FIG. 4, a master cylinder 50 is connected to a chassis brake tube line 52 by a first wet fitting 42. The chassis brake tube line is connected by a second wet fitting to a T fitting 53. The T fitting 53 is then connected to two axle brake tube lines 54 by third and fourth wet fittings. The opposite ends of the axle brake tube lines 54 are connected to brake hoses 21 by fifth and sixth wet fittings and the brake hoses 21 are in turn connected to the brake mechanism caliper 56, of the brake on the wheel by seventh and eighth wet fittings.

Referring now to FIG. 5, the brake system of the present invention is illustrated wherein a master cylinder 50 is connected by a first wet fitting to a chassis brake tube line 52 which is connected by a second wet fitting at its other end to a manifold brake hose end fitting 20 of a brake hose 21 which is connected by a third wet fitting on its other end to the caliper 56 of the brake of one wheel. The manifold brake hose end fitting 20 is connected by a fourth wet fitting to a second brake hose 21 through a male connector and a second female connector 32 preferably formed through one of the wrench flats 41. The second brake hose 21 is connected by a fifth wet fitting on its other end to the brake caliper 56 of the other wheel. The minimum number of wet fittings required for the system shown in FIG. 6 is five while that of the prior art requires nine wet fittings.

As an alternative, an axle brake tube line 54 may be connected to the manifold brake hose end fitting 20 instead of the second brake hose 21 if it is desirable to reduce the length of the second brake hose 21. The opposite end of the axle brake tube line 54 would then be connected by a sixth wet fitting to the second brake hose 21 adding one more wet fitting to the system.

Figure 7:
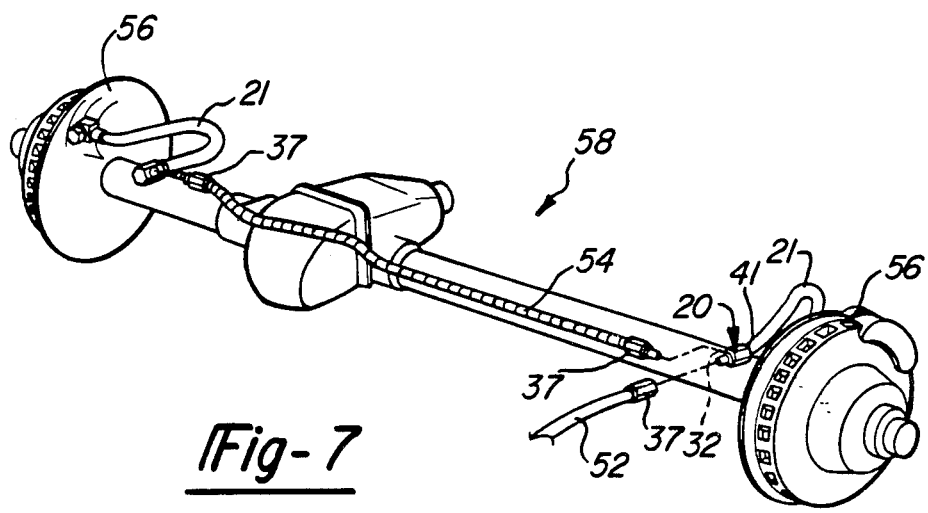
FIG. 7 is a perspective partially exploded fragmentary view of a rear axle and brake hydraulic system.

FIGS. 6 and 7 depict rear axle assemblies 58 and their associated brake hose systems showing in FIG. 6 a prior art brake system and in FIG. 8 a brake system in accordance with the present invention.

Referring now to FIG. 6, the rear axle assembly 58 is shown with a fragmentary portion of the frame 59 of a vehicle. The chassis brake tube line 52 is secured to the frame 59 by means of a mounting flange 60 which is secured to the frame and includes a bore 61 to which the chassis brake tube line 52 is connected at its fitting. THe chassis brake tube line 52 is secured in the flange 60 by means of a clip 62 and a snap washer 63 which permit the brake lines to be disassembled from the vehicle for service and yet provide a secure mounting for the tube lines and brake hoses. A brake hose 21 is connected to the chassis brake tube line 52 on one end and on its other end to a Y fitting 64, which could also be a T fitting 53 if desired. The Y fitting 64 is in turn connected to two axle brake tube lines 54 which extend along the axle toward the right and left wheels and are secured to the axle by means of mounting flanges 60 which are secured to the vehicle axle. The axle brake tube lines 54 are connected to brake hoses 21 on their other end and secured in place by means of a clip 62 and snap washer 63 as previously described. The Y fitting 64 is secured to the axle by means of a bolt 65 as is well known in the art. The brake hoses 21 extend between the axle brake tube lines 54 and the calipers 56 of each wheel brake to accommodate movements of the caliper relative to the axle that could damage a less flexible tubing.

In the illustrated prior art rear brake system, a total of eight wet fittings are required between the master cylinder 50 and the brake caliper 56 as follows: one between the chassis brake tube line 52 and the brake hose having the Y fitting; two between the Y fitting 53 and the axle brake tube lines 54; two between the other end of the axle brake tube lines 54 and the two brake hoses 21; and, two between the other ends of the brake hoses 21 and the two calipers of the brakes on each wheel. In addition, one wet fitting not shown on FIG. 7 is the wet fitting between the chassis brake tube line 52 and the master cylinder 50.

Referring now to FIG. 7, a brake system made in accordance with the present invention is shown to include a chassis brake tube line 52 which is connected to the master cylinder (not shown) and terminates in a male connector 37 and is connected to a manifold brake hose end fitting 20 which is secured to a brake hose 21. The brake hose 21 on its opposite end is connected directly to the caliper 56 of one wheel. The manifold brake hose end fitting 20 includes a side female connector 32 in one of the wrench flats 41. A chassis brake tube line 54 having a male connector 37 on both ends is connected on one end to the manifold brake hose end fitting 20 in the side receptacle 32. The opposite end of the chassis brake tube line 54 is connected to a brake hose 21 which interconnects the chassis brake tube line 54 to the caliper 56.

In the illustrated rear brake system of the present invention, a total of six wet fittings are required between the master cylinder and the brake calipers 56 as follows: one between the master cylinder and the chassis brake tube line 52, one between the male connector 37 on the opposite end of the chassis brake tube line 52 and the manifold brake hose end fitting 20; one between the manifold brake hose end fitting and chassis brake tube line 54, one between the other end of the chassis brake tube line 54 and a brake hose 21 end fitting; and, two between the brake hoses 21 and the brake calipers 56.

The precise configuration of the chassis brake tube lines, axle brake tube lines and brake hose 21 routing will be dictated in part by the requirements of a particular vehicle. However, the manifold brake hose end fitting 20 will also produce advantages results if it used as a symmetrical connector between two brake hoses of substantially equal length which are connected to a centrally disposed chassis brake tube line.

New brake systems are presently being developed to prevent wheel lock-up by sensing devices which are conected in a feedback system which monitors wheel rotation. The anti-wheel lock-up system monitor wheel rotation at the wheel and include hydraulic, pneumatic, vacuum or electronic systems which are preferably located adjacent the wheel.

Another development in braking systems is the provision of redundant braking system that provide hydraulic pressure to each front disc brake caliper via two separate pressure lines.

The above developments in brake systems can be easily accommodated by an alternative split flow embodiment of the modular manifold brake hose end fittings of the present invention. Referring to FIG. 8, an unique split flow embodiment of the present invention is shown wherein two parallel fluid circuit may be routed through the same manifold brake hose end fittings using the same connections to the chassis. The parallel fluid circuit 67 is comprised of female connectors 32 interconnected by a conduit 68 which is separate from the internal conduit 28 of the hydraulic brake system. The parallel fluid circuit 67 may be a pneumatic, vacuum or hydraulic system used in an anti-lock-up feedback system or to provide a redundant braking system. If a redundant braking system is desired, a sleeve 25 and tubular extension 26 for a crimped fitting 23 may be provided which would be in fluid communication with the conduit 68.

It will be readily appreciated that the manifold brake hose end fitting can be modified to accommodate one, two, three or more separate flow paths as needed. In all cases, at least one end of the modular manifold brake hose end fitting is assembled to a flexible reinforced elastomeric, or rubber, hose of the brake system.

Thus, it is apparent that there has been provided, in accordance with the invention, a manifold brake hose end fitting which may be incorporated in a system and used in a method that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

I claim:

1. A brake system comprising:
    a brake actuator for generating a control pressure;
    a master cylinder means for containing a hydraulic fluid and for generating an amplified output pressure in response to changes in the control pressure, said master cylinder means being operatively connected to the brake actuator;
    a high pressure hydraulic fluid distribution system having a trunk line in fluid communication with the master cylinder for distributing hydraulic fluid to at least two separate brake calipers;
    an end fitting at the opposite end of said trunk line from said master cylinder means including a male connector comprising a cylindrical threaded member having a concave conical portion in the end face thereof;
    a first reinforced elastomeric brake hose having a manifold brake hose end fitting including first and second female connectors being cylindrical openings having internally threaded cylindrical sides and end faces formed at the inner ends of said cylindrical openings, said end faces having convex conical nipples centrally located in said end faces, said nipples being in fluid communication with an internal conduit formed in said manifold brake hose end fitting for connecting the conduit to said trunk line end fitting through said first female connector, the brake hose being directly connected to one of said brake calipers on its other end; and
    a second brake hose having a male connector including a cylindrical threaded portion having an end face including a concave conical nipple centrally located therein at said end face, said second brake hose being connected to said second female connector on one end and being connected to the other of said brake calipers on another end.

2. The brake system of claim 1 wherein said manifold brake hose end fitting is a solid one-piece body having an integral tubular cylindrical sleeve extending from one end of the body, a tubular extension located concentrically within said sleeve, said brake hose being a reinforced elastomeric hose received between said sleeve and said extension and being retained thereon by a crimped portion of said sleeve wherein said sleeve is mechanically deformed radially inwardly at an intermediate point thereon.

3. The brake system of claim 1 further comprising:
    a second fluid distribution system for distribution a fluid to an apparatus adjacent a wheel of a vehicle;
    third and fourth female connectors being cylindrical openings having internally threaded cylindrical sides and end faces formed at the inner ends of said cylindrical openings, said end faces having convex conical nipples centrally located in said end faces, said third and fourth female connectors being interconnected through said manifold end fitting, said secondary fluid distribution system being routed through the third and fourth receptacles, whereby a single manifold end fitting is included in the hydraulic fluid system and a secondary fluid distribution system.

4. A method of assembling high pressure brake fluid distribution conduits on a vehicle comprising the steps of:
    attaching a trunk line having first and second ends, said first end being connected to a master cylinder, said second end having an end fitting having a male connector including a cylindrical threaded portion;
    securing said second end to the vehicle at a site on the vehicle not movable relative to the vehicle;
    threadably attaching a first brake hose to said male connector, said first brake hose including a reinforced elastomeric hose attached on one end to a manifold end fitting and on another end to an end fitting having a male connector including a cylindrical threaded portion, said manifold end fitting having at least two female connectors formed therein, said female connectors including a threaded cylindrical bore, wherein one of said female connectors is threaded onto said male connector on the second end of the trunk line;
    threadably attaching a second brake hose to the second female connector of the manifold end fitting, said second brake hose including a reinforced elastomeric hose attached on both ends to end fittings, each end fitting have a male connector including a cylindrical threaded portion which is received in said second female connector;
    threadably attaching the male connector formed at the other end of said first brake hose to a first brake caliper; and
    attaching the male connector located at the other end of said brake hose to a second brake caliper.

5. The method of claim 4 wherein said trunk line is a substantially rigid tubular fluid conduit and said second brake hose is a substantially rigid tubular fluid conduit which is serially connected to a flexible brake hose and said method further comprises securing the rigid tubular fluid conduit to an axle of the vehicle.

6. The method of claim 4 including the additional steps of:
    attaching a first end fitting of a second fluid conduit not in fluid communication with said trunk line by a male connector including a cylindrical threaded portion to a third female connector formed in said manifold end fitting, said female connector including a threaded cylindrical bore;
    threadably attaching a second end fitting of said second fluid conduit to a fourth female connector formed in said manifold end fitting, said male connector of the second end fitting including a cylindrical threaded portion and said female connector includes a threaded cylindrical bore;
    said third and fourth female connectors being in fluid flow connection through the manifold end fitting whereby said method of installing brake fluid conduits on a vehicle also includes installing a separate fluid conduit in the same manifold end fitting used by the brake fluid conduit.

* * * * *